March 8, 1955 J. J. STAMM 2,703,845
ELECTRIC LOCOMOTIVE CONTROL
Filed March 6, 1953

United States Patent Office 2,703,845
Patented Mar. 8, 1955

2,703,845

ELECTRIC LOCOMOTIVE CONTROL

John J. Stamm, Franklin, Pa., assignor to Westinghouse Electric Corporation, East Pittsburgh, Pa., a corporation of Pennsylvania Application March 6, 1953, Serial No. 340,840

23 Claims. (Cl. 290—17)

My invention relates to locomotive control apparatus, and specifically it relates to certain improvements in a locomotive control system which is the subject-matter of my prior Patent 2,546,023, granted March 20, 1951.

My invention is particularly needed in, and was primarily developed for, a gas-turbine electric locomotive, but it is also applicable to diesel-electric locomotives, and, in general, to any electrically propelled locomotive which is powered by any kind of fuel-consuming prime mover.

Among the many novel control-features which are included in the present invention, may be mentioned the following:

(a) A motor-control system in which a voltage-reducing means is provided, for causing an automatic reduction in the effective supply-voltage which is available for the series-type traction-motor or motors, at a rate which is as rapid as is reasonably compatible with an acceptably smooth power-reduction in the motor or motors, while the master controller remains in some advanced position; coupled with a voltage-restoring means, for causing an automatic increase in said effective supply-voltage, but only at a somewhat slower rate of voltage-change, said last-mentioned rate, while slower, being neverthless as rapid as is reasonably compatible with an acceptably smooth power-increase in the motor or motors. By this means, I am enabled to accomplish a transition, say from a series motor-connection to a parallel motor-connection, which is so smooth that it cannot be felt, and in fact can be detected only by the engineman watching the indicator-dials in the cab. By this same means, also, I can quickly and automatically stop wheel-slippage, by using any sort of wheel-slip relay, which automatically reduces the effective supply-voltage, and keeps on reducing it until the slippage stops, after which the voltage is automatically restored again, at the somewhat slower rate, so as to effect a smooth reapplication of power to the traction-motor or motors.

(b) A novel feature of my upward-transition control is that the transition-initiating means first causes the commencement of the automatic voltage-reduction, and an undervoltage relay is then used, to respond to a particular reduced value of voltage, to commence the electrical circuit-changes which are necessary to effect the transition to a higher-speed motor-combination. This use of an undervoltage relay avoids difficulties which have heretofore been encountered as a result of previous transition-systems which relied upon fixed or predetermined time-delays, or predetermined current-values, both of which are subject to wide variations, dependent upon the grade of the track, or the weight or the speed of the train. The undervoltage relay contributes appreciably to the smoothness of transition, which has already been mentioned in item (a). A particular control-system, using this transition-feature, uses a plurality of voltage-relays, which respond to successively higher voltages, as the supply-voltage is being increased, the first voltage-relay being used to automatically introduce field-shunting, while the series motor-connection is being used, while a second (or subsequently operating) voltage-relay automatically initiates the voltage-reduction which is preliminary to a transition-operation, while the dropping-out of the field-shunting voltage-relay initiates the tansition by first dropping out the field-shunts, and then instantly and automatically effecting the transition, after which the field-shunts are again applied, during the subsequent rising-voltage, when the voltage rises to the point where the field-shunting voltage-relay is again picked up, either at the same voltage-setting or at a modified voltage-setting.

(c) In the field-shunting systems just described, my invention relates to an improved operation of the reverse-transition operation, which is usually effected, in accordance with a known practice, in response to an overcurrent relay. According to my invention, the overcurrent relay initiates three things practically simultaneously, namely, starting a voltage-reduction period, starting the deenergization of the field-shunting means, and starting the backward transition, to a lower-speed motor-combination. In accordance with my invention, however, I provide a slight time-delay means, which delays the reapplication of the field-shunting means, after the dropping out of the overcurrent relay, for some four or five seconds, or such other time as may be necessary for a substantial subsidence of the switching-transients in the motor-currents.

(d) As a specific means for providing an automatic voltage-reducing and voltage-restoring means, which provides a somewhat slower rate of voltage-restoration than voltage-reduction, I prefer to provide an engine-driven variable-voltage generator, with a prime-mover control-means, having a governor for controlling the speed of the prime-mover, in combination with a dual-actuator control-means for controlling a rheostat which controls the generator-voltage. This dual-actuator rheostat-controlling means has a first lost-motion rheostat-actuating means, which is responsive to the variable fluid-pressure which controls the governor of the prime mover, and a second lost-motion rheostat-actuating means which is responsive to the speed of the prime-mover. When an automatic voltage-reducing operation is called for, the governor-controlling fluid-pressure of the master controller is dumped, or quickly reduced, thereby simultaneously deenergizing the prime-mover governor so as to shut off the fuel-supply, and simultaneously reducing the pressure on the first-mentioned actuator, which causes the rheostat to be adjusted to its full-resistance position, corresponding to a minimum generator-voltage. When the generator-voltage is to be restored, the restoration takes place at a somewhat reduced rate, as will be subsequently described.

(e) With the foregoing and other objects in view, and with other refinements which will be hereinafter referred to, my invention consists in the circuits, systems, combinations, apparatus, parts, and methods of design and operation, as hereinafter described, and illustrated in the accompanying drawing, wherein the single figure is a diagrammatic representation of much simplified circuits and apparatus, representing the bare essentials of an exemplary form of embodiment of my invention, omitting such parts as are not necessary to an understanding of my present improvements.

Figure 1:
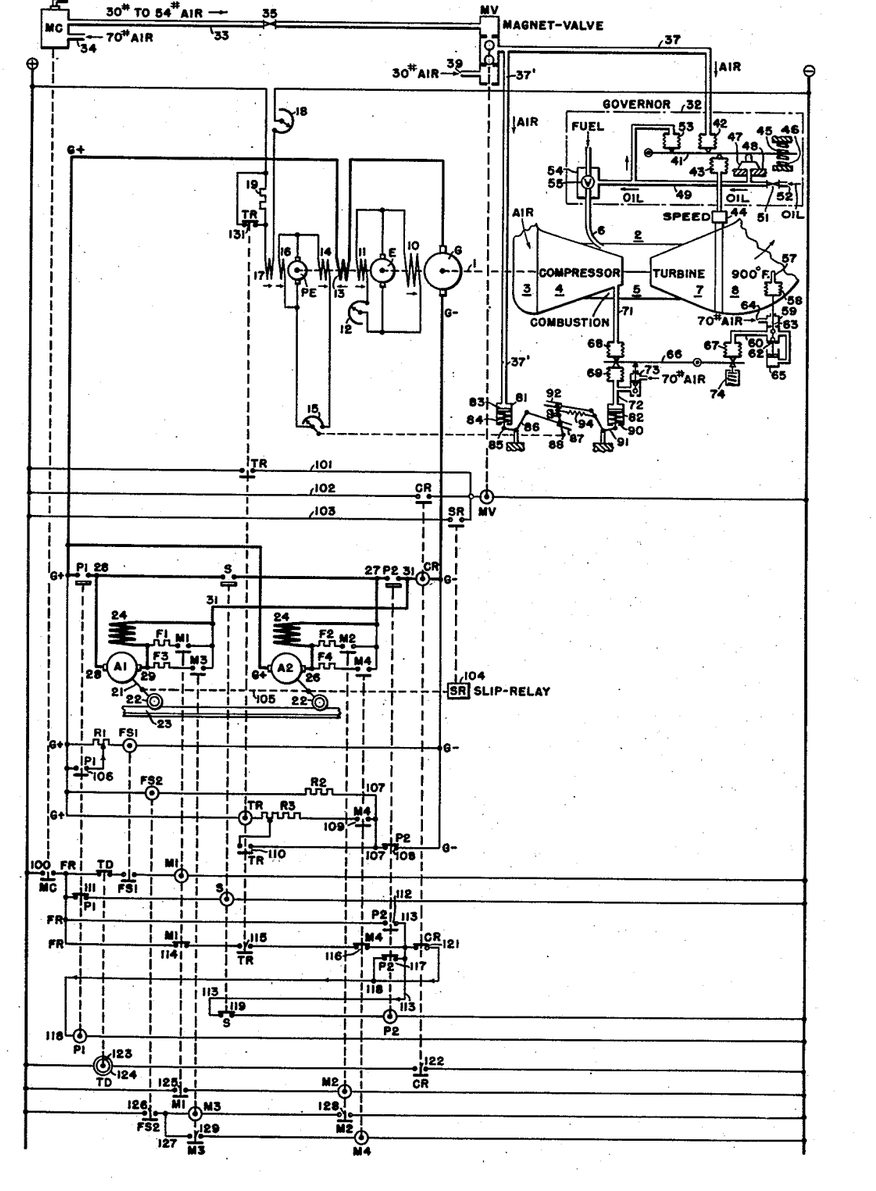

I have illustrated my invention as being applied to a gas-turbine electric locomotive, in which a variable-voltage direct-current dynamoelectric generator G, a dynamoelectric exciter E, and a dynamoelectric pilot exciter PE, are all mounted on the shaft 1 of a gas turbine 2, which is diagrammatically represented as having an air-intake duct 3, a compressor 4, a combustion chamber 5, a fuel-intake 6, a turbine 7, and an exhaust-chamber 8.

In the illustrated apparatus, the generator G is provided with a separately excited field-winding 10, which is connected across the armature of the exciter E. The exciter E is provided with three field-windings, the first being a self-excited field-winding 11, which is connected across the armature of the said exciter E, through a manually adjustable field-rheostat 12. The second exciting field-winding of the exciter E is a differential series winding 13, which is energized in series with the output-circuit of the generator G. The third exciting field-winding of the exciter E is a cumulative separately excited winding 14, which is connected across the armature of the pilot exciter PE, through an automatically adjustable field-rheostat 15, which I call a load-positioner rheostat, because it "positions" or determines the load-versus-speed characteristic of the generator G, or the manner in which the generator-voltage varies with the generator-speed, or the level of the output-voltage of the generator G. The pilot exciter PE is shown as having a self-excited field-winding 16, which is connected across the armature of the pilot exciter PE, and a cumulative separately excited winding 17, which is connected across battery-terminals (+) and (—), through a manually adjustable field-rheostat 18 and an automatically controlled resistance 19.

While I have thus described a particular kind of prime mover, for driving the generator G, and a particular kind of multi-stage variable-voltage dynamoelectric exciter-means, for the generator, and while my invention is particularly needed in such a system, I wish it to be distinctly understood that I am not limited, in the broadest aspects and applications of my invention, to any particular type of fuel-consuming prime mover, or any particular type of excitation-system for the generator G. In any event, the output-versus-speed characteristic of the generator must be correlated with the output-versus-speed characteristics of the prime mover, so as not to stall the prime mover, and preferably also so as to closely approximate the maximum-efficiency load-values of the prime mover at the different operating-speeds of the prime mover.

A gas-turbine is well known to have an extremely steep output-versus-speed characteristic, throughout the useful operating-range of the turbine, and when such a prime mover is used, it is necessary for the generator G to have a similar characteristic, or even a faster rate of output-variation in response to speed, which is best obtained by means of a multi-stage system of direct-driven self-excited exciters and pilot exciters, as set forth in the Atwell and Jenkins Patent 2,539,173, granted January 23, 1951. When other types of prime movers are used, however, or even when one or more gas turbines are used, it may not be absolutely necessary to use a multi-stage system of direct-driven dynamoelectric exciters and pilot exciters, provided that a suitable excitation-control is used. I wish it to be understood, therefore, that the exciting field-winding 10 of the generator G is intended to be broadly representative of any suitable exciting-means for the generator, whether said field-winding 10 is a self-excited or a separately excited winding; and I wish it to be understood that the illustrated exciter E and pilot exciter PE are intended to be broadly representative of any suitable excitation-means for the excitation of the generator G.

It is to be understood that the generator G and the prime mover 2 constitute a power-plant which is carried by a locomotive or other electrically propelled vehicle. The output of the generator G is absorbed by one or more direct-current series-type traction-motors, usually a plurality of such motors, which are illustrated, in their simplest form, as comprising two traction-motors A1 and A2, each driving its own axle 21, on which is mounted a pair of drive-wheels 22 which are supported by a pair of track-rails 23, only one of which is shown.

In some of the broader aspects of my invention, the variable-voltage generator G may be regarded as representative of any means for making a variable supply-voltage effectively available for the traction-motors A1 and A2, whatever that supply-means may be. Certain features of my invention are applicable to any supply-source or system, whereby the voltage which is applied to the terminals of the motors A1 and A2 is variable, by any means whatsoever. At the same time, other objects and advantages of my invention are directly related to the use of a variable-voltage generator G, driven by a fuel-consuming prime mover 2, as the specific means for applying a variable supply-voltage to the traction-motor or motors, such as A1 and A2. Also, while I have illustrated the generator G and the motors A1 and A2 as being direct-current machines, I am not limited to this detail, as these machines could be alternating-current, as well as direct-current, so far as the essential features of my invention are concerned.

In the illustrated form of embodiment of my invention, the traction-motors A1 and A2 are series motors, each motor having an armature member, and a series field-winding 24. If the vehicle is to move in either of the two directions, forward and reverse, the field-windings 24 will have to be supplied with reverser-switches, which are well known, and which have been omitted, for the sake of simplification, as they have nothing to do with the essential features of my present invention.

It is also frequently desirable for the traction-motors to be provided with one or more transition-means, for changing the motor-connection from one to another of a plurality of series-parallel motor-combinations. Some features of my present invention are particularly applicable to the operation of such a transition-means. I have therefore illustrated a simple and desirable transition-means, whereby the positive armature-terminal of the motor A2 is connected to the positive generator-bus G+ of the output-circuit of the generator G. The negative armature-terminal 26 of this motor A2 is connected, through its series field-winding 24, to a conductor 27.

For the series motor-connection or combination, the last-named conductor 27 is connected, through a series switch S, to the positive terminal 28 of the other motor A1, and the negative terminal 29 of this motor A1 is connected, through its field-winding 24, to a conductor 31, which is connected, through an overcurrent relay-coil CR, to the negative generator-terminal G—.

In the parallel motor-connection or combination, the series switch S is open, and two parallel-connection switches P1 and P2 are closed. The parallel-connection switch P1 connects the positive terminal 28 of the motor A1 directly to the positive generator-terminal G+, while the parallel-connection switch P2 connects the negative terminal-connection 27 of the other motor A2 directly to the conductor 31, which is connected to the negative generator-bus G— through the operating-coil of the current-relay CR.

Most traction-motor control-systems use, at one time or another, some form of field-weakening means for the motors A1 and A2, for reducing the ratio between the field-strength and the motor-current of the motors, at a time when the voltage of the supply-source, such as G, is at least moderately high. Such field-weakening means are usually used in the highest-speed motor-combination or connection, such as the parallel-motor connection, wherein it constitutes the final step of the acceleration-control of the motors. In most prime-mover electric locomotives, the field-weakening step is also used as the final accelerating-step in each of the lower-speed motor-combinations or connections, such as the series-motor connection, and some features of my invention are directly related to such usage.

The field-weakening means practically always takes the form of some kind of field-shunt; frequently variable, which is connected across the respective series field-windings 24 of the motors. In the illustrated system, I show two field-shunts, F1 and F3, for the field-winding 24 of the motor A1, and two other field-shunts, F2 and F4, for the field-winding 24 of the other motor A2. These four field-shunts F1 to F4 are connected and disconnected by means of correspondingly numbered switches M1 to M4.

As shown at the top of the drawing, the operation of the vehicle is under the control of a master controller MC. This master controller MC is used to control a governor 32, for controlling the fuel-input 6 into the prime mover 2, to control the speed of the prime mover, and to maintain approximately constant speed and output characteristics for any given setting or positioning of the master controller MC, as will be described hereinafter. To this end, it is desirable that the master controller MC shall include or control a variable fluid-pressure means, for supplying a control-fluid, which may be compressed air, in a master-controller output-pipe 33, at pressures varying between any desirable predetermined minimum pressure, such as 30 pounds per square inch, and any desirable predetermined maximum pressure, such as 54 pounds per square inch, according to the position of the master controller MC. These pressures are given only by way of example, as will be readily understood.

Any desirable means may be used for causing a movement of the master-controller handle to cause the desired fluid-pressure changes in an output-pipe 33. While I am not limited specifically thereto, the type of master-controller pressure-controlling means, which I have illustrated, is a master controller MC in the form of a valve-means, which may be similar to the well known air-brake valve, such as is used to control the application of air-brakes in vehicles. Each position of the operating handle of the master controller MC comprises means (not shown), for maintaining some specific output-pressure in the output-pipe 33, these output-pressures being increased, in easy steps, for successive positions of the master controller, as the master controller is advanced, from its off-position, to its full-on position. I have shown the master controller MC as being equipped with an inlet-pipe 34, through which compressed air is supplied at any suitable pressure, such as 70 pounds per square inch.

Somewhere in the fluid-pressure means of the master controller MC, for example in the output-pipe 33, I provide a choke valve 35, or other means for providing a passage-restriction, to control the rate at which the compressed air, or other fluid, may be delivered through said output-pipe 33.

Some novel features of my present invention involve the use of a control-valve, preferably in the form of an electrically controlled valve or magnet-valve MV, which is interposed between the output-pipe 33 of the master controller MC and the governor-controlling air-pressure pipe 37, or other variable-fluid-pressure control-pipe, which controls the governor 32 for the prime mover 2. The magnet-valve MV has a normal position, in which the governor-controlling pipe 37 is connected to the master-controller output-pipe 33; and this valve is movable to an actuated position in which said governor-controlling pipe 37 is connected to a pressure-reducing opening or outlet 39. Preferably, although not necessarily, it will be found desirable to connect this valve-outlet 39 with a suitable source of air-pressure, or other fluid-pressure, if some other fluid is used, which is maintained at approximately the minimum output-pressure of the master controller MC. In the illustrated example, this minimum pressure is 30 pounds per square inch. This is because the minimum output-pressure of the master controller sets the governor 32 for the idling speed of the prime mover, and it is desirable that the magnet-valve MV, when it is actuated, shall not reduce the governor-controlling pressure below this minimum idling-speed pressure, or some similar pressure, even though the magnet-valve MV should be held for a long time in the actuated position.

No particular form of governor 32 is absolutely required, save that it should have a differential response to the governor-controlling fluid-pressure in the control-pipe 37, and the speed of the prime mover 2.

However, in power-plants in which it is desirable for a given master-controller position to maintain a fair constancy of horsepower-output, without the aid of auxiliary equipment, and regardless of whether the generator is hot or cold, I have discovered that it is quite desirable to choose a governor 32 of a type having a small droop in its speed-versus-load curve or characteristic. This is because, when the generator gets hot, its load-versus-speed curve drops down below that which was obtained when the generator was cold, or in other words, at any given speed, the output of the generator will fall off, as the generator heats up. In one example, in a gas-turbine electric locomotive, at 100% speed, if the governor held the speed absolutely constant as the generator heated up, the 100% generator-output, when cold, would drop to about 85%, when the generator was hot, that is, assuming a full-on position of the master controller MC, and assuming that the governor 32 kept the gas-turbine speed absolutely constant at 100%. However, if the governor had a suitable droop in its speed-versus-load characteristic, when the generator-output began to fall off, due to the heating of the generator, the governor would slightly increase the speed, so that perhaps only a 6% load-loss would occur as a result of the heating of the generator, because the speed would be slightly increased, to compensate for most of the load-loss due to the heating of the generator.

As shown in the drawing, I have chosen a hydraulic-cup type of governor 32, which is diagrammatically indicated as comprising a pivoted beam 41, which is pressed down by a bellows 42 which is responsive to the governor-controlling air-pressure in the pipe 37, and which is pressed upwardly by a bellows 43 which is supplied with oil or other fluid, under a pressure which is responsive to the turbine-speed, as produced in a suitable speed-responsive device 44. The pivoted beam 41 is centered between upper and lower compression-springs 45 and 46, respectively. It is also pressed upwardly by an inverted cup-member 47, which rests lightly on a suitable horizontal support 48, and which receives oil from a pipe 49, which is fed, through a choke-valve 51, from an oil-supply-source 52. The amount of downward pressure of the beam 41 on the inverted cup 47 controls the rate at which oil escapes underneath the edges of the cup, and hence, because of the choke-valve 51, this controls the pressure-drop in the choke, and hence the oil-pressure which is maintained in the pipe 49. The governor is also illustrated as having a suitable feed-back-means, in the form of a bellows 53 which presses downwardly on the beam 41, in response to the controlled oil-pressure in the pipe 49.

The governor 32 also has a suitable fuel-controlling mechanism, which is diagrammatically indicated by block diagram at 54. The controlled oil-pressure in the pipe 49 is applied to this fuel-controlling mechanism 54, which controls the operation of a fuel-valve 55 in the fuel-supply line 6.

It is also a feature of my invention to provide a dual-actuator control-mechanism for the load-positioner rheostat 15, so that this rheostat is responsive, not only to the turbine-speed, as in my above-mentioned previous patent, but it is responsive also to the governor-controlling air-pressure in the input-pipe 37 of the governor 32. I have devised a special lost-motion linkage-mechanism for this purpose.

My previously mentioned patent shows the use of the air-pressure which is produced in the compressor 4, or other air-compressing means of the prime mover 2, as a means for obtaining a response to the speed of the prime mover. As also pointed out in my aforesaid patent, this compressor-pressure is also a function of the air-temperature and the air-density of the intake-air in the duct 3, because the compressor-pressure varies in response to these quantities, as well as in response to the turbine-speed, and the variation in the compressor-pressure, as a result of temperature or density, is also in the same general direction as the consequent variation in the output of the turbine, so that, while the compressor-pressure is mainly responsive to the turbine-speed, it does slightly depart from a linear speed-response, according to the altitude and the temperature of the intake-air.

According to my present invention, I prefer to still further modify the action or effect of the compressor-pressure, in response to some critical temperature-condition of the prime mover 2. Any suitable temperature-condition may be chosen, but by way of giving a specific example, I have chosen to illustrate an exhaust-temperature thermostat or responsive device 57, which is schematically indicated as operating through a bellows 58 to actuate an air-escapement valve 59, which produces a variable air-pressure, in an output-pipe 60, which is responsive to the temperature of the thermostat 57. Thus the thermostat 57 is placed within the exhaust-duct 8, and is set to respond to any desired predetermined exhaust-temperature, such as 900° F., just by way of illustration. When this critical temperature is reached, the bellows 58 expands and operates the escapement-valve 59 to close an escape-opening 62 and open an inlet-valve 63, so as to admit a little 70-pound air, through a supply-port 64, so as to increase the air-pressure in the outlet-pipe 60. This same outlet-pipe pressure is also applied to a piston-chamber 65, which opposes the expansion-movement of the bellows 58. In this way, the air-pressure in the output-pipe 60 is made to vary in accordance with the thermally responsive device 57 in the exhaust-duct 8 of the gas turbine.

In my present invention, I provide a pneumatic relay or totalizer, which is diagrammatically indicated as comprising a pivoted beam 66 which is operated upon by three different bellows 67, 68 and 69, or other equivalent fluid-pressure means. The bellows 67 is filled with a thermally responsive air-pressure, from the pipe 60, so as to tend to rotate the beam 66 in a clockwise direction, with a relatively short moment-arm, so that the thermal effect is relatively small. The bellows 68 is filled with compressed air, through a pipe 71 which leads to the compressor 4, so as to be responsive to the previously discussed compressor-pressure. This compressor-controlled bellows 68 operates as a speed-responsive device, responsive to the turbine-speed, to tend to rotate the beam 66 in a counterclockwise direction, with a relatively long moment-arm, so that the movement of the beam is largely dependent upon the compressor-controlled bellows 68.

The counterclockwise moment, which is exerted on the beam 66 by the compressor-controlled bellows 68, is opposed by the bellows 69, which is impressed with an air-pressure, in a pipe 72, which is proportional to the compressor-pressure in the pipe 71, minus a fraction of the thermally responsive pressure in the pipe 60. This response is obtained as follows. When the beam 66 moves very slightly in the counterclockwise direction, in response to the compressor-controlled bellows 68, it operates on an air-escapement valve 73, which may be similar to the previously described air-escapement valve 59. A slight counterclockwise movement of the beam 66 thus increases the air-pressure in the pipe 72, until the increased pressure in this pipe, and in the corresponding bellows 69, counterbalances the forces tending to move the beam in a counterclockwise direction, thus restoring balanced conditions on the beam. The controlled-pressure air, in the pipe 72, is thus the air which I use to control my speed-responsive actuator-mechanism.

If desired, the operation of the thermally responsive bellows 67 may be opposed by a compression-spring 74, which may be set to permit the thermally responsive mechanism to be effective only after a predetermined temperature-limit or range has been exceeded.

My automatic actuating-means, for controlling the load-positioner rheostat 15, may now be described. It comprises two actuators, or spring-biased piston-members, 81 and 82. The first actuator 81 is supplied with variable air-pressure (or other fluid-pressure) from a branch 37' of the governor-controlling air-pressure pipe 37. It will be recalled that the pressure in this pipe 37 is responsive to the output-pressure of the master controller MC, unless the magnet-valve MV is actuated, in which case the magnet-valve takes control. This first actuator 81 may therefore be called a valve-controlled actuator, or a master-controller-controlled actuator. It comprises a piston 83 which, when the air-pressure is high enough, opposes a biasing-spring 84, and pushes the piston-stem 85 downwardly, so as to rotate a bell crank 86 in a counterclockwise direction, and it thus withdraws a lost-motion fork 87 from a rheostat-operating lever 88, so as to permit said lever to be moved in a clockwise direction, so as to move the field-positioner rheostat 15 in a clockwise direction which reduces the amount of resistance in series with the exciter-winding 14. Normally, however, that is, before the master-controller-controlled air-pressure reaches a value higher than its minimum value of, say, 30 pounds per square inch, the biasing-spring 84 of this actuator 81 moves the bell crank 86 in a clockwise direction, which causes the lost-motion fork 87 to push the rheostat 15 toward a normal position, in which the resistance is a maximum and the voltage of the generator G is a minimum.

The other actuator 82 is a speed-responsive actuator, which is supplied with variable air-pressure from the previously described pipe 72, which has, in it, an air-pressure which is responsive to the difference between the pressure in the compressor-pressure pipe 71 and a fraction of the pressure in the thermally responsive pipe 60. This speed-responsive actuator 82 has a biasing-spring 90, which normally tends to rotate a bell crank 91 in a counterclockwise direction, which tends to push a lost-motion fork 92 in a direction which moves the load-positioner rheostat 15 toward its normal or full-resistance position, but this lost-motion fork 92 is preferably not capable of pushing the rheostat 15 all the way over to its normal position, so that there is a range of rheostat-movement which is not controlled by the pushing-action of the biasing-spring 90 of the speed-responsive actuator 82. It will be understood, that when the speed-responsive air-pressure in the pipe 72 becomes large enough, it will overcome the bias of the spring 90, in this actuator 82, and will then move the bell crank 91 in a clockwise direction.

My dual load-positioner actuating-means also includes a third spring 94, which is connected so as to bias the operating-lever 88 of the rheostat 15 toward the second lost-motion means 92. The operation of the rheostat-controlling actuating-mechanism, as a whole, will be explained after the control-circuit connections of my locomotive control-equipment have been further set forth.

The various relays, switches and magnetic devices of my apparatus are diagrammatically represented as vertical-stem devices, which are down in the normal or non-actuated positions of the devices, and which are raised, as against gravity-bias, in the actuated positions thereof. These electrically or magnetically operated devices are shown in their normal, deactuated, or down positions. They are each identified by a letter or letters, or a combination of letters and numeral suffixes, and the same designation is applied to all parts of a switch or relay or magnetic device, in accordance with a convention which is intended to indicate the mechanical connections of the parts, by means of the like legends or letters of all of the parts. Each relay-coil or magnet-coil is indicated by means of a circle, inside of which is placed a smaller circle representing an armature, which is disposed to be drawn upwardly, raising the stem of the element, whenever the coil is energized.

The master-controller MC is provided with one interlocking contact-member MC, which is also designated by the numeral 100. This contact-member is normally open, that is, it is open when the master-controller MC is in its illustrated off-position, and said contact 100 is closed when the master controller MC is moved to any of its plurality of on-positions. This master-controller contact 100 is operative, when the master-controller is moved from its off-position, to apply the positive battery-voltage (+) to a so-called forward-or-reverse control-circuit conductor FR, which is used to initiate the energization of the traction-motors A1 and A2, as will be subsequently described.

The magnet-valve MV is provided with an actuating-coil MV, which, when energized, will lift up the valve-stem so as to move the valve from its illustrated normal position to its actuated position. This magnet-valve coil MV is energized whenever any one of three relays is energized, namely, a transititon-relay TR, the previously mentioned current-relay CR, or a slip-relay SR, as shown by the respective relay-contacts in the three parallel-connected energizing-circuits 101, 102 and 103 for this MV-coil.

The operating mechanism of the slip-relay SR is diagrammatically indicated by a block-diagram 104, which is intended to represent any relay-means or combination, for automatically changing from a normal condition (or down-condition) to an actuated or elevated condition or position, when one or more of the traction-motors A1 or A2 is slipping, said slip-relay being further automatically operative to restore itself to its normal condition at the termination of the slipping-period. I use the term "slipping", in its ordinary locomotive-sense, as describing a condition in which the associated traction-wheels 22 are slipping on the rails 23, as distinguished from the condition in which there is substantially no sliding-motion between the peripheries of the wheels and the respective rails. Any slip-relay control-means can be used, whether electrical, responding to the electrical condition of the motors, or mechanical, responding directly to the speeds of the various motor-driven axles. This dependence of the slip-relay mechanism 104 upon the motors or motor-axles is intended to be diagrammatically indicated by a dotted horizontal line 105, connecting the two axles 21 to the slip-relay 104.

The various control-circuit connections are shown after the manner of a schematic or across-the-line diagram.

The first control-circuit, underneath the track 23 in the diagram, shows that the operating-coil of a first field-switch FS1 is energized directly across the generator-terminals G+ and G—, in series with a voltage-adjusting resistance R1, which is small, to indicate that this switch picks up at a lower generator-voltage than the second field-switch FS2, the operating-coil of which has a somewhat larger voltage-adjusting resistance R2 in series with it. The first voltage-adjusting resistance R1 is partly shorted out, when the first parallel-connection switch P1 is closed, as indicated by the P1-contact 106.

The operating-coil of the second field-switch FS2, and its serially connected resistance R2, are connected between the positive generator-terminal G+ and a conductor 107. This conductor 107, in the illustrated form of embodiment of my invention, is connected to the negative generator-bus G—, through the back-contact, or normally closed contact 108, of the second parallel-connection switch P2, this P2-contact 108 being used because, in the particular control-system which has been chosen for the illustration of my invention, the second field-shunting control-switch FS2 was not used in the parallel-motor connection or combination of the traction-motors A1 and A2, whereas both field-shunting switches FS1 and FS2 were used in the series-motor connection or combination.

In the illustrated form of embodiment of my invention, a third voltage-responsive switch or relay was used, as an automatic upward-transition intiating-means, for automatically initiating the transfer of the motor-combination or connections from the series or low-speed connections to the parallel or high-speed connections, when the voltage of the generator G reaches a value which is still higher than the pickup voltage-value of the second field-switch FS2. This third voltage-responsive switch or relay is called a transition-relay TR, and it has an operating-coil TR, which is connected between the positive generator-bus G+ and the previously described conductor 107, through a still larger resistance R3, and also through a make-contact 109 of the fourth field-shunt switch M4. As soon as the transition-relay TR picks up, it closes a make-contact 110 to establish a holding-circuit which bypasses the M4-contact 109 and most of the voltage-adjusting resistance R3, so that the transition-relay TR will not drop out, or return to its nonresponsive condition, in response to any subsequent drop in the value of the generator-voltage, during expectable operating-conditions. Thus, the transition-relay TR, once it is actuated, remains actuated until the opening of the back-contact 108 of the second parallel-connection switch P2, which marks the completion of the parallel motor-connections or combination.

We come next to a group of circuits under the control of the master-controller make-contact 100 and the forward-or-reverse conductor FR. The first such circuit serially includes the back-contact TD of a time-delay relay TD which will be subsequently described, in series with the make-contact FS1 of the first field-switch FS1, and the operating-coil of the first field-shunt relay M1. This puts the initial energization of the field-shunt relay M1 under the control of the first voltage-responsive switch or relay FS1, which is responsive to the voltage of the generator G. Thus, when the generator-voltage increases, due to the advancement of the master controller MC and the increased speed of the prime mover 2, and when this voltage-increase reaches a certain predetermined value, the first voltage-responsive field-switch FS1 picks up and energizes the field-shunt relay M1, which closes its M1-contact in series with the first field-shunt F1.

The second control-circuit which is energized from the forward-or-reverse conductor FR contains the operating-coil of the series-connection switch S, and a back-contact 111 of the first parallel-connection switch P1. Thus, this series switch S picks up, and closes its main motor-circuit contact S, thereby establishing the series motor-connection or combination, as soon as the master controller MC is moved to its first on-position, which closes the MC-contact 100. Thereafter, the series switch S remains actuated until the first parallel-connection switch P1 opens, in the process of effecting an upward transition from the series motor-connection to the parallel motor-connection.

The next control-circuit, which is shown underneath the operating-coil S of the series switch S, is a holding-circuit which is established by a P2 make-contact 112, which connects the FR conductor to a circuit-conductor 113 when the second parallel-connection switch P2 is closed or moved to its actuated position. In parallel with the holding-circuit containing the P2-contact 112, is a circuit which serially includes a back-contact 114 of the first field-shunt relay M1, a make-contact 115 of the transition-relay TR, and a back-contact 116 of the last field-shunt relay M4. In this way, the circuit 113 is not immediately energized, as soon as the transition-relay TR picks up, but the energization of said circuit 113 must thereafter await the dropping out of the field-shunting relays M1 and M4, in a manner which will be subsequently described, after which the aforesaid conductor 113 will be energized, and the actual transition-operation will be started.

The conductor 113, which has just been described, is connected, by means of a P2 back-contact 117, to a circuit 118, which is the energizing-circuit for the operating-coil P1 of the first parallel-connection switch P1. Thus, as soon as the circuit 113 is energized, the first parallel-connection switch P1 picks up, thereby starting the upward transition from the series motor-connection to the parallel motor-connection. This first parallel-connection switch P1 opens its back-contact 111, immediately de-energizing the series-connection switch S, which thereupon drops out and closes its back-contact 119, which establishes an energizing-circuit from the conductor 113 to to the operating-coil P2 of the second parallel-connection switch P2, thereby picking up this switch and completing the transition to the parallel motor-connection. At the same time, the second parallel-connection switch P2 opens its back-contact 108, which thereupon deenergizes the second field-switch FS2 and the transition-relay TR for the duration of the parallel-connection motor-operation.

In accordance with a known operational control, the downward transition, from the high-speed or parallel motor-connection to the low-speed or series motor-connection, is placed under the control of the current-relay CR. This current-relay has a back-contact 121, which is in parallel with the P2 back-contact 117, so that the P1 energizing-circuit 118 is not interrupted by the actuation of the second parallel-connection switch P2. Thus, the parallel-connection switch P1, and hence also the parallel-connection switch P2, remain closed or actuated or energized, until the combined motor-currents of the two parallel-connected motors A1 and A2, or the total load-current of the generator G, reaches a predeterminedly high current-value, whereupon the current-relay CR picks up and initiates the downward transition, as will be subsequently described.

It will be noted that the current-relay CR also has a make-contact 122, which is in series with the operating-coil 123 of a time-delay relay TD, so that, as soon as the current-relay CR picks up, it energizes this time-delay relay TD and opens the TD back-contact in series with the operating-coil of the first field-shunting relay M1. The time-delay relay TD is provided with a means for causing it to have a short time-delay in its drop-out-action. Any suitable delayed-operation means could be used, for this purpose, the same being illustrated and symbolized by means of a lag-ring 124, which does not sensibly or importantly delay the pickup-operation of the relay, but makes the relay delay its return to its nonresponsive condition, after its operating-coil 123 has been deenergized, for a short time, such as four or five seconds, or such other short time-delay which experience shows to be sufficient for a substantial subsidence of the switching-transients in the motor-currents.

The last three control-circuits of the drawing contain the interlocking controls for the second, third and fourth field-shunting relays M2 to M4. The actuating coil of the M2 relay is actuated by the M1 make-contact 125, as soon as the first field-shunting relay M1 is actuated. The actuation of the third field-shunting relay M3 waits for the picking up of the second voltage-responsive field-switch FS2, which closes a make-contact 126 between the positive battery-bus (+) and a circuit 127. The circuit 127 energizes the third field-shunting relay M3, through an M2 make-contact interlock 128; and as soon as the M3 relay picks up, it energizes the M4 relay through an M3 make-contact 129.

The operation of the illustrated apparatus will now be reviewed, with special attention to the novel features of my invention.

I direct attention, first, to the special automatic voltage-controlling means, which is operative at all on-positions of the master controller MC, independently of which on-position is occupied by the master controller. In the illustrated form of embodiment of my invention, this voltage-controlling means is all under the control of the magnet-valve MV. When the magnet-valve is actuated, as a result of an energization of its actuating-coil MV, an automatic voltage-reducing operation is produced. When the magnet-valve MV is deactuated, an automatic voltage-restoring operation is produced.

These automatic voltage-reducing and voltage-restoring operations are needed at one or more of various periods in the operation of the traction-motors A1 and A2. I have shown three motor-controlling means, TR, CR, and SR, any one of which is capable of energizing the magnet-valve MV, and temporarily holding it energized, as long as may be needed. It is to be understood, however, that some locomotive control-systems may not require all three of these means, while other control-systems may require additional or different means. In the illustrated system, the voltage-controlling magnet-valve MV is actuated, as an initial step, whenever an upward transition is called for by the upward-transition initiating-means TR: again, this magnet-valve MV is actuated whenever the downward-transition initiating-means CR calls for a downward transition from a high-speed motor-connection or combination to a low-speed motor-connection or combination: and finally, whenever one of the locomotive drive-wheels slips, for any cause, and under any conditions, the slip-relay SR actuates this voltage-controlling magnet-valve MV, and holds it actuated until the slipping stops.

In accordance with my invention, the voltage-controlling magnet-valve MV does two things, in order to control the voltage of the generator G. The manner in which the magnet-valve accomplishes these purposes is to quickly dump or release the air-pressure which is being supplied to the governor-controlling pipe 37 according to the position of the master controller MC. As previously explained, this governor-controlling air-pressure is not dumped to zero, or is preferably not dumped to zero, or to atmospheric pressure, but only to a certain predetermined minimum value, such as 30 pounds per square inch, which is necessary to hold the governor 32 in a position to keep the prime mover 2 idling, without stalling.

When the governor-controlling air-pressure in the pipe 37 is dumped or suddenly reduced by reason of an actuation of the magnet-valve MV, two things happen. One of these things is to cause the governor 32 to shut off the fuel-valve 55 of the prime mover 2, until the speed of the prime mover is reduced to its idling speed. It takes some time, however, for the speed of the prime mover to drop from any power-supplying condition to an idling value, and no locomotive-control scheme could successfully wait such a long time for a voltage-reduction in the generator G, particularly when a high-speed prime mover is being used, such as a gas turbine.

It is necessary, therefore, simultaneously with the shutting-off of the fuel-valve 55, to automatically manipulate the load-positioner rheostat 15, so as to change the voltage-level and the steepness of the voltage-versus-speed characteristic of the governor G, in order to reduce the generator-voltage. To accomplish this purpose, it would not be sufficient to rely solely upon the initial speed-reduction in the prime mover 2, as by the beginning of a pressure-drop in the compressor-pressure pipe 71. It is necessary, or at least extremely advantageous, to provide an actuator 81, which is directly and instantly responsive to a dumping of the air-pressure in the governor-controlling pipe 37. And hence such an actuator 81 is provided, in my present invention. The biasing spring 84, of this actuator 81, is sufficiently strong to overpower the speed-responsive actuator 82 when the magnet-valve MV suddenly dumps the governor-controlling air-pressure in the pipe 37. In this manner, without waiting for a speed-reduction response, the voltage-controlling rheostat 15 is moved to its extreme maximum-resistance position, corresponding to a minimum generator-voltage or voltage-characteristic.

The voltage of the generator G thus begins to die down or decrease at a rapid rate, which is limited by the time-constants of the generator and its exciters, whereby a certain time is required for a flux-change in any of these machines. At the same time, the speed of the generator and of the prime mover is being reduced, usually at a somewhat slower rate, because of the shutting off of the fuel-valve 55. By this combination of means, therefore, the actuation of the magnet-valve MV results in an automatic voltage-reduction in the generator G, independently of the position of the master controller MC, at a rate which is as rapid as is reasonably compatible with an acceptably smooth power-reduction in the traction-motors, such as A1 and A2.

Now, when the voltage-reducing magnet-valve MV is released, or restored to its normal condition in which it connects the governor-controlling air-pressure pipe 37 to the output-pipe 33 of the master controller MC, it is, in general, quite desirable, or extremely advantageous, for the generator-voltage to be restored, or brought up to a voltage-value close to its previous value, at a somewhat slower rate of voltage-change, which is again as rapid as is reasonably compatible with an acceptably smooth power-increase in the traction-motors, such as A1 and A2. In practically all locomotive-control equipments, it is necessary, or quite desirable, for the rate of voltage-increase, after a momentary reduction in voltage, to be sensibly slower than the rate of voltage-reduction, in order to maintain smooth train-operation, and to avoid damage to the motors. My apparatus provides several means for bringing about this slower rate of voltage-increase, and any or preferably all of these means may be used.

The choke-valve 35, in the fluid-pressure means of the master controller MC, serves as a sufficient passage-restriction means, to make the rate of pressure-increase in the governor-controlling pipe 37, when the magnet-valve MV is restored to its normal position after a movement to its actuated position, sensibly slower than the rate of pressure-decrease when the magnet-valve MV suddenly dumped the governor-controlling air-pressure at the moment when said magnet-valve was moved to its actuated position. The master-controller choke-valve 35 produces little or no noticeable effect when the master-controller handle is moved at any normal rate, where only slow or small pressure-changes are made in the air-pressure in the governor-controlling pipe 37; but when a sudden or large pressure-increase is to be produced, said choke valve 35 is quite useful in reducing the suddenness with which this large pressure-change can be made.

A second means, which I have provided, for making the automatic voltage-restoration slower than the automatic voltage-reduction, as a result of the voltage-controlling magnet-valve MV, is to be found in the dual-actuator load-positioner actuating-means, 81 to 94, which controls the voltage-characteristic-positioning field-rheostat 15. When the magnet-valve MV is restored to its normal position, after a brief or momentary movement to its actuated position, the choke-retarded pressure-increase in the governor-controlling pipe 37, and in the branch-pipe 37', causes the piston 33 of the valve-responsive actuator 81 to overcome the biasing spring 84 and retract the lost-motion fork-member 87, thus permitting the rheostat-biasing spring 94 to move the load-positioner rheostat 15 in a direction away from its normal idling position, thus causing the generator-voltage to begin to increase.

Meanwhile, however, in the brief or momentary time during which the magnet-valve MV was in its actuated condition, the speed of the prime mover 2 has become reduced to a certain value, causing the speed-responsive actuator 82 to assume some position corresponding to the speed of the prime mover. The rheostat-actuating spring 94, in response to the restoration of some pressure in the branch-pipe 37' of the first actuator 81, moves the load-positioner rheostat only partway back toward its position which it had before the voltage-controlling magnet-valve was actuated. This partway-movement is until the rheostat-controlling lever 88 engages the forked lost-motion member 92 of the speed responsive actuator 82. Thereafter, the readjusting movement of the load-positioner rheostat 15 is under the control of the speed-responsive actuator 82, so that the rheostat completes the rest of its movement at a much slower rate, as the prime mover 2 finally comes back up to speed again, corresponding to the position or pressure-setting of the master controller MC. This works out to give a remarkably smooth train-operation, as the generator-voltage is being automatically increased, after a brief or momentary voltage-drop which is called for by one of the three motor-controlling relays TR, CR or SR.

As previously described, my present speed-responsive actuator 82 is modified, so that it does not respond exactly to either the turbine-speed or the compressor-pressure in the pipe 71, but this response is slightly reduced when certain high-temperature conditions are obtained in any point of the prime mover 2, such as in the air-intake 3, the fuel-intake 6, the combustion-chamber 5, or the exhaust-duct 8. It is well known that the temperature-conditions in a prime mover, and particularly in a gas turbine, make a difference in the horsepower-output of the prime mover, and this horsepower-output or capability of the prime mover is reduced as the temperature is increased, or when a certain temperature-range is reached.

It is desirable, at all times, for the output-versus-speed characteristic-curve of the generator G to match the maximum-efficiency output-capability of the prime mover. In order to maintain this condition, when the prime mover is operating in its hot range, and also to prevent stalling of the prime mover by reason of the generator taking more power from it than it is capable of delivering, when hot, it is necessary for the voltage-level, or the steepness of the voltage-versus-speed characteristic, of the generator G to have a proper value which is dictated by the reduced output-capability of the prime mover during its hot operating-conditions, which are its worst operating-conditions. My thermally responsive means 57—60—67 serves to hold the generator-characteristic to the required voltage-level or voltage-steepness, while the turbine is operating hot, while permitting the generator to have a higher voltage-versus-speed characteristic, so as to utilize the full capacity of the prime mover, and the highest efficiency of the prime mover, when the prime mover is operating cold. This is a practical detail which is quite important, if the best operation is to be obtained, and this is particularly true of gas turbines, although the need for this detail may be encountered also in other types of prime movers.

My dual-actuator load-positioner rheostat-controlling means is also quite effective during the control of the traction-motors A1 and A2. A movement of the master controller MC from its off-position to its first on-position, or to its second or third on-position, more or less, according to the adjustment, results in an increased master-controller air-pressure, which increases the fuel-flow and speeds up the turbine. But without waiting for a sensible increase in the turbine-speed above its idling speed, the increased master-controller air-pressure will move the master-controller-responsive actuator 81, retracting the forked lost-motion device 87, and permitting the rheostat-actuating spring 94 to move the load-positioning field-rheostat 15 to a reduced resistance-value, thus increasing the voltage-level and the voltage-steepness-characteristic of the generator G. This operation may be effective during the first three notches of the master-controller operation, or up to any other desired intermediate point in the advancement of the master controller. From this point on, during the further acceleration of the traction-motors A1 and A2, the speed-responsive actuator 82 takes over, and begins to retract its forked lost-motion member 92 in response to the turbine-speed, or the compressor-pressure pipe 71, as modified by the thermally responsive device 57—60—67, as previously described. Thereafter, on still more advanced on-positions of the master controller MC, the generator G has a load-characteristic which matches that of the prime mover 2, so that it absorbs a power which is commensurate with the most efficient output-capabilities of the prime mover, at whatever speed the prime mover is operating.

The voltage of the generator G, and the speed of the traction-motors A1 and A2, are controlled by the adjustment of the master controller MC to different on-positions, each of which corresponds to a different speed or power-output of the prime mover 2. Thus, the turbine-speed actually sets the excitation-characteristics of the generator G, thus permitting as rapid an acceleration of the turbine as may be desired, with the loadings of the turbine being controlled as a function of the turbine-speed. In some types of prime movers, such as gas turbines and diesel engines, it is very important to maintain a fixed ratio of fuel to air, and this arrangment of making the generator-excitation characteristics dependent upon the speed of the prime mover is very effective in permitting the prime mover to be controlled in any desired manner which maintains this important fuel-to-air ratio, while making the generator-regulation automatically dependent upon the engine-speed, thus preventing overloading of the engine.

My dual-actuator load-positioner rheostat-controlling means is also sufficiently flexible to give a very necessary prompt response to a situation in which the locomotive engineman moves the master controller MC from a high notch to a lower position, in an effort to reduce the generator-output. In switching a locomotive, it is imperative that the generator-output shall correspond almost immediately to the master-controller position, particularly when the output is being reduced; otherwise the control of the locomotive might become very difficult. In my apparatus, the master-controller-responsive actuator 81 has a biasing spring 84 which is strong enough to overpower the air-pressure in the input-pipe 72 of the speed-responsive actuator 82. Hence, when the engineman moves the master controller to a lower notch, thus reducing the governor-controlling air-pressure in the pipes 37 and 37', this biasing spring 84 will immediately change the setting of the load-positioning rheostat 15, by pushing back the speed-responsive actuator 82, thus giving the engineman the necessary control over his locomotive, without waiting for the speed of the prime mover to be reduced.

Another important feature of my present invention is the use of a predetermined undervoltage-response, as obtained by the dropping out of the first voltage-responsive relay or switch FS1, or by any equivalent means, whereby an actual change of the motor-connections, in an upward transition, shall be made dependent upon the actual voltage which is available across the terminals of the traction-motors such as A1 and A2. If this voltage is too high, the transition will not only be extremely rough, but may also result in motor flashing and other serious motor-damage. If the transition is made at too low a voltage, the transition will again be unnecessarily rough. Heretofore, transition-systems have relied upon clumsier methods of control, including fixed time-delays, which were sometimes built into the various switching equipments, or voltage or current-responses. However, the operating-conditions of a train are subject to wide variations, with respect to grades, train-loads, motor-speeds, and other variables.

My improved upward-transition control-means has resulted in the smoothest upward transition which has ever yet been achieved. It utilizes, as its principal or essential features, first an automatic voltage-reduction at a rate which is as fast as is reasonably compatible with an acceptably smooth power-reduction in the traction motors, then a response to a precise predetermined reduced-voltage value for effecting the transition in the motor-connections, and finally an automatic restoration or increase in the motor-voltage, at a rate which is somewhat slower than the rate of voltage-decrease, but which is as rapid as is reasonably compatible with an acceptably smooth power-increase in the traction-motors.

My above-mentioned response to a precise predetermined reduced-voltage value, for choosing the moment at which an actual change or transition of the motor-connections is made, in an upward-transition operation, is the dropping out of the first voltage-responsive field-switch FS1. The contact of this switch thereupon deenergizes the first field-shunt switch M1, whose contact 125 immediately deenergizes the second field-switch M2, which contact 128 immediately deenergizes the third field-switch M3, whose contact 129 immediately deenergizes the fourth field-switch M4, thereby restoring full-field conditions to the traction-motors A1 and A2. The deenergization of this fourth field-switch M4 energizes the circuit 113 through the circuit which contains the closed contacts 114, 115 and 116, and this energizes the first parallel-connection switch P1, through the circuit 117—118. The P1 back-contact 111 opens, and drops out the series-switch S, whose back-contact 119 closes and pulls in the second parallel-connection switch P2, thus completing the upward transition. The P2 back-contact 108 now opens, deenergizing the transition-relay TR, thus deactuating the voltage-controlling magnet-valve MV, so that the voltage-restoration operation commences. These sequence-responsive switching-operations, starting with the dropping-out of the field-switch FS1, occur in a moment of time, so that the actual transition is effected very quickly.

As an added feature of this upward transition-means, which has not yet been mentioned in the description, the top of the stem of the transition-relay TR is often preferably provided with a back-contact 131, which opens and inserts the additional resistance 19 in the excitation-circuit of the battery-energized field-winding 17 of the pilot exciter PE, thus still further reducing the generator-voltage and the slope of the voltage-versus-speed characteristic of the generator G, in addition to the effect of the dual-actuator-controlled load-positioning rheostat 15 which has already been described.

During the downward-transition operation, from a high-speed motor-combination to a low-speed motor-combination, the use of an overcurrent relay CR has been known before, but I have added several very desirable features which make the operation much better. I believe that it is new to use the operation of the current-relay CR to energize a time-delay relay TD, which remains actuated for some three to five seconds, or other desirable time, after the deenergization of the current-relay CR, in order to permit the motor-current to stabilize, before field-shunting is reestablished in the lower-speed motor-combination. It is also new, to use the current-relay CR to energize an automatic voltage-controlling means, such as the magnet-valve MV, so as to initiate the automatic voltage-reducing operation which has already been described. In the same connection, it is also new to wait for an actual dropping-out of the current-relay CR, as a result of the reduced currents which are drawn by the motors in their lower-speed motor-combination or connections, and as a result, also, of the dropping voltage, before smoothly reapplying the fuel and the electrical load, as above described. By these various means, I avoid all danger of any hunting of the transition, by reason of a premature picking-up of the current-relay.

Thus, on the downward transition, the top contact of the current-relay CR actuates the voltage-controlling magnet-valve MV; the middle CR-contact 121 deenergizes the parallel-connection switch P1, which momentarily deenergizes the traction-motor A1, leaving only the motor A2 connected to the generator; and the bottom CR-contact 122 energizes the time-delay relay TD, which deenergizes the first field-shunting relay M1. Several things thereupon begin happening at once. The fuel is cut off, the generator-excitation is reduced, the dropped-out parallel-connection switch P1 closes its back-contact 111 and energizes the series switch S, which momentarily short-circuits the motor A1, as long as the other parallel-connection switch P2 remains actuated, but the actuation of the series switch S opens its back-contact 119 and immediately deenergizes the second parallel-connection switch P2. Meanwhile, the first field-shunting relay M1 drops out, opening its back-contact 125 and dropping out the second field-shunting relay M2. It will be recalled that the other two field-shunting relays M3 and M4 were not in use, during the parallel motor-combination or connections, in the particular system which is illustrated in the drawing.

These operations result in a reduction in the current which is drawn by the two motors A1 and A2, principally because these motors are now connected in series with each other. Hence, the current-relay CR drops out, and deenergizes the voltage-controlling magnet-valve MV, and at the same time, the bottom CR-contact 122 deenergizes the time-delay relay TD and sets in operation its time-delayed dropout-time, after which the energizing-circuit for the first field-shunting relay M1 is completed, thereby permitting the motor-fields to be shunted again, in the series or low-speed motor-combination or connections, after a time-delay which is sufficient for the substantial subsidence of the switching-transients in the motor-currents, thus preventing an immediate reenergization of the overcurrent-relay CR as a result of a weakening of the motor-fields, due to field-shunting. This time-delay means, TD, is usually necessary because the downward transition does not wait upon an actual voltage-reduction, as in the case of an upward transition, and hence the downward transition may be completed before there has been a voltage-reduction sufficient to drop out the first field-switch FS1.

Other operational features have been mentioned during the description of the apparatus, and still other operational features will be obvious to those skilled in the art, who are familiar with previous practices in locomotive-control.

I wish it to be understood that my illustrated control-system is only one of many forms of my embodiment of my invention, which could have been chosen for illustration. The illustrated connections and apparatus have been very much simplified, in order to expedite a description of the essential novel features of my invention. I wish it to be understood that various known refinements could and would be used, and various features might be added, without departing from the essential features of my invention; and also various elements may be replaced by equivalent devices, or some features could be omitted entirely, without departing from the essential spirit of my invention.

I claim as my invention:

1. A traction-motor control-assembly for an electrically propelled vehicle, including, in combination: (a) a plurality of traction-motors which are to be controlled; (b) a variable-voltage supply-means, for making a variable supply-voltage effectively available for said motors; (c) a transition-means, for changing the motor-connections from one to another of a plurality of series-parallel motor-combinations; (d) an upward-transition initiating means, which is operative, when actuated from a normal condition to an actuated condition, to cause an automatic reduction in said effective supply-voltage, from a voltage-value which is at least moderately high, at a rate which is as rapid as is reasonably compatible with an acceptably smooth power-reduction in the motors; said upward-transition initiating-means also including a voltage-responsive means, automatically responsive to a predetermined reduced value of the effective supply-voltage, for causing a forward operation of said transition means (c), to a higher-speed motor-combination; and (e) an operation-completing means, automatically responsive to a completion of the aforesaid transition, for causing an automatic increase in said effective supply-voltage, up to a voltage-value close to its previous value, at a somewhat slower rate of voltage-change, which is as rapid as is reasonably compatible with an acceptably smooth power-increase in the motors.

2. A traction-motor control-assembly for an electrically propelled vehicle, including, in combination: (a) a plurality of series-type traction-motors which are to be controlled, each motor having an armature member and a series field-winding; (b) a variable-voltage supply-means, for making a variable supply-voltage effectively available for said motors; (c) a transition-means, for changing the motor-connections from one to another of a plurality of series-parallel motor-combinations; (d) a field-weakening means, which is operative, when actuated from a normal condition to an actuated condition, to reduce the ratio between the field-strength and the motor-current of said motors at a time when the voltage of the supply-source is at least moderately high; (e) an upward-transition initiating-means, which is operative, when actuated from a normal condition to an actuated condition, to cause an automatic reduction in said effective supply-voltage, from a still-higher voltage-value, at a rate which is as rapid as is reasonably compatible with an acceptably smooth power-reduction in the motors; said upward-transition initiating-means also including a voltage-responsive means, automatically responsive to a predetermined reduced value of the effective supply-voltage, for causing said field-weakening means to be restored to its normal full-field condition, and a further means, automatically responsive to a completion of said field-restoring operation, for causing a forward operation of said transition means (c), to a higher-speed motor-combination; and (f) an operation-completing means, automatically responsive to a completion of the aforesaid transition, for causing an automatic increase in said effective supply-voltage, up to a voltage-value close to its previous value, at a somewhat slower rate of voltage-change, which is as rapid as is reasonably compatible with an acceptably smooth power-increase in the motors.

3. A traction-motor control-assembly for an electrically propelled vehicle, including, in combination: (a) a plurality of series-type traction-motors which are to be controlled, each motor having an armature member and a series field-winding; (b) a variable-voltage supply-means, for making a variable supply-voltage effectively available for said motors; (c) a master controller, for controlling the operation of said vehicle; (d) a transition-means, for changing the motor-connections from one to another of a plurality of series-parallel motor-combinations; (e) a voltage-controlling means, which is operative at all on-positions of the master controller (c), independently of which on-position is occupied by the master controller; said voltage-controlling means being operative, when actuated from a normal condition to an actuated condition, at a time when the master controller is in an at least moderately advanced on-position, to cause an automatic reduction in said effective supply-voltage, at a rate which is as rapid as is reasonably compatible with an acceptably smooth power-reduction in the motors; said voltage-controlling means being further operative, when restored to its normal condition, to cause an automatic increase in said effective supply-voltage, up to a voltage-value close to the value normally corresponding to the position of the master controller (c), at a somewhat slower rate of voltage-change, which is as rapid as is reasonably compatible with an acceptably smooth power-increase in the motors; (f) a transition-controlling voltage-responsive means, responsive to a predetermined reduced value of said effective supply-voltage; (g) an upward-transition initiating-means, which is operative, when actuated from a normal condition to an actuated condition, to cause an automatic actuation of the voltage-controlling means (e), as an initial upward-transition step; (h) a means tending to cause an upward transition of the transition-means (d), to a higher-speed motor-combination, whenever the transition-controlling voltage-responsive means (f) is in its responsive condition at a time when the upward-transition initiating-means (g) is in its actuated condition; and (i) a means for deactuating said upward-transition initiating-means (g) when said upward transition (h) has been effected.

4. A traction-motor control-assembly for an electrically propelled vehicle, including, in combination: (a) a plurality of series-type traction-motors which are to be controlled, each motor having an armature member and a series field-winding; (b) a variable-voltage supply-means, for making a variable supply-voltage effectively available for said motors; (c) a master controller, for controlling the operation of said vehicle; (d) a transition-means, for changing the motor-connections from one to another of a plurality of series-parallel motor-combinations; (e) a field-weakening means, which is operative, when actuated from a normal condition to an actuated condition, to reduce the ratio between the field-strength and the motor-current of said motors at a time when the voltage of the supply-source is at least moderately high; (f) a voltage-controlling means, which is operative at all on-positions of the master controller (c), independently of which on-position is occupied by the master controller; said voltage-controlling means being operative, when actuated from a normal condition to an actuated condition, at a time when the master controller is in an at least moderately advanced on-position, to cause an automatic reduction in said effective supply-voltage, at a rate which is as rapid as is reasonably compatible with an acceptably smooth power-reduction in the motors; said voltage-controlling means being further operative, when restored to its normal condition, to cause an automatic increase in said effective supply-voltage, up to a voltage-value close to the value normally corresponding to the position of the master controller (c), at a somewhat slower rate of voltage-change, which is as rapid as is reasonably compatible with an acceptably smooth power-increase in the motors; (g) a field-controlling voltage-responsive means, responsive to said effective supply-voltage, having an actuating response at a predetermined intermediate value of the effective supply-voltage, and returning to its nonresponsive condition at a predetermined lower value of the effective supply-voltage; (h) a transition-controlling voltage-responsive means, responsive to the voltage of the supply-source, having an actuating response at a predetermined higher value of the effective supply-voltage, and having a holding-circuit means for making its effective return to its nonresponsive condition substantially independent of the value of the effective supply-voltage during expectable operating-conditions; (i) a means tending to cause an actuation of the field-weakening means (e), whenever the field-controlling voltage-responsive means (g) is in its actuated condition; (j) a means tending to cause an actuation of the voltage-controlling means (f), whenever the transition-controlling voltage-responsive means (h) is in its actuated condition; (k) a means tending to cause an upward transition of the transition-means (d), to a higher-speed motor-combination, when the field-weakening means (e) is in its normal condition and when, at the same time, the transition-controlling voltage-responsive means (h) is in its actuated condition; (l) a means tending to hold the transition-means (d) in said upward-transition condition when said upward transition is completed; and (m) a means for causing the transition-controlling voltage-responsive means (h) to return to its nonresponsive condition when said upward transition (k) is completed.

5. A traction-motor control-assembly for an electrically propelled vehicle, including, in combination: (a) a plurality of series-type traction-motors which are to be controlled, each motor having an armature member and a series field-winding; (b) a variable-voltage supply-means, for making a variable supply-voltage effectively available for said motors; (c) a transition-means, for changing the motor-connections from one to another of a plurality of series-parallel motor-combinations; (d) a field weakening means, which is operative, when actuated from a normal condition to an actuated condition, to reduce the ratio between the field-strength and the motor-current of said motors at a time when the voltage of the supply-source is at least moderately high; (e) a downward-transition initiating-means, which is operative, when actuated from a normal condition to an actuated condition, to cause an automatic reduction in said effective supply-voltage, from a voltage-value which is at least moderately high, at a rate which is approximately as rapid as is reasonably compatible with an acceptably smooth power-reduction in the motors; said downward-transition initiating-means also including a substantially simultaneously operating means for automatically causing a backward operation of said transition-means, to a lower-speed motor-combination; said downward-transition initiating-means also including a substantially simultaneously operating means for automatically causing said field-weakening means to be restored to its normal full-field condition; and (f) an operation-completing means, automatically responsive to a completion of the aforesaid transition, for causing an automatic increase in said effective supply-voltage, up to a voltage-value close to its previous value, at a somewhat slower rate of voltage-change, which is as rapid as is reasonably compatible with an acceptably smooth power-increase in the motors; said operation-completing means also including a delayed-operation means, automatically operative with a short time-delay which is sufficient for a substantial subsidence of the switching-transients in the motor-currents, for causing an actuation of said field-weakening means to a weakened-field condition.

6. A traction-motor control-assembly for an electrically propelled vehicle, including, in combination: (a) a plurality of series-type traction-motors which are to be controlled, each motor having an armature member and a series field-winding; (b) a variable-voltage supply-means, for making a variable supply-voltage effectively available for said motors; (c) a master controller, for controlling the operation of said vehicle; (d) a transition-means, for changing the motor-connections from one to another of a plurality of series-parallel motor-combinations; (e) a field-weakening means, which is operative, when actuated from a normal condition to an actuated condition, to reduce the ratio between the field-strength and the motor-current of said motors at a time when the voltage of the supply-source is at least moderately high; (f) a voltage-controlling means, which is operative at all on-positions of the master controller (c), independently of which on-position is occupied by the master controller; said voltage-controlling means being operative, when actuated from a normal condition to an actuated condition, at a time when the master controller is in an at least moderately advanced on-position, to cause an automatic reduction in said effective supply-voltage, at a rate which is as rapid as is reasonably compatible with an acceptably smooth power-reduction in the motors; said voltage-controlling means being further operative, when restored to its normal condition, to cause an automatic increase in said effective supply-voltage, up to a voltage-value close to the value normally corresponding to the position of the master controller (c), at a somewhat slower rate of voltage-change, which is as rapid as is reasonably compatible with an acceptably smooth power-increase in the motors; (g) a current-responsive means, responsive to a current which is supplied by said supply-means, having an actuating response at a predetermined high value of said current, and returning to its nonresponsive condition at a predetermined lower value of said current; (h) a means tending to cause a downward transition of the transition-means (d), to a lower-speed motor-combination, whenever said current-responsive means (g) is in its actuated condition; (i) a means tending to cause a substantially simultaneous actuation of the voltage-controlling means (f), whenever said current-responsive means (g) is in its actuated condition; (j) a deactuating means tending, substantially simultaneously, to cause the field-weakening means (e) to assume its normal full-field condition, whenever said current-responsive means (g) is in its actuated condition; and (k) a delayed-operation means, automatically operative when said current-responsive means (g) returns to its non-responsive condition, to sustain the operation of said deactuating means (j) for a short time-delay which is sufficient for a substantial subsidence of the switching-transients in the motor-currents.

7. The invention as defined in claim 6, in combination with: (l) a field-controlling voltage-responsive means, responsive to said effective supply-voltage, having an actuating response at a predetermined intermediate value of the effective supply-voltage, and returning to its nonresponsive condition at a predetermined lower value of the effective supply-voltage; and (m) a means tending to cause an actuation of the field-weakening means (e), whenever the field-controlling voltage-responsive means (l) is in its actuated condition.

8. A traction-motor control-assembly for an electrically propelled vehicle, including, in combination: (a) a plurality of series-type traction-motors which are to be controlled, each motor having an armature member and a series field-winding; (b) a variable-voltage supply-means, for making a variable supply-voltage effectively available for said motors; (c) a master controller, for controlling the operation of said vehicle; (d) a transition-means, for changing the motor-connections from one to another of a plurality of series-parallel motor-combinations; (e) a field-weakening means, which is operative, when actuated from a normal condition to an actuated condition, to reduce the ratio between the field-strength and the motor-current of said motors at a time when the voltage of the supply-source is at least moderately high; (f) a voltage-controlling means, which is operative at all on-positions of the master controller (c), independently of which on-position is occupied by the master controller; said voltage-controlling means being operative, when actuated from a normal condition to an actuated condition, at a time when the master controller is in an at least moderately advanced on-position, to cause an automatic reduction in said effective supply-voltage, at a rate which is as rapid as is reasonably compatible with an acceptably smooth power-reduction in the motors; said voltage-controlling means being further operative, when restored to its normal condition, to cause an automatic increase in said effective supply-voltage, up to a voltage-value close to the value normally corresponding to the position of the master controller (c), at a somewhat slower rate of voltage-change, which is as rapid as is reasonably compatible with an acceptably smooth power-increase in the motors; (g) a transition-controlling voltage-responsive means, responsive to a predetermined reduced value of said effective supply-voltage; (h) a current-responsive means, responsive to a current which is supplied by said supply-means, having an actuating response at a predetermined high value of said current, and returning to its nonresponsive condition at a predetermined lower value of said current; (i) an upward-transition initiating-means, which is operative, when actuated from a normal condition to an actuated condition, to cause an automatic actuation of the voltage-controlling means (f), as an initial upward-transition step; (j) a means tending to cause an upward transition of the transition-means (d), to a higher-speed motor-combination, whenever the transition-controlling voltage-responsive means (g) is in its responsive condition at a time when the upward-transition initiating-means (i) is in its actuated condition; (k) a means for deactuating said upward-transition initiating-means (i) when said upward transition (j) has been effected; (l) a field-weakening initiating-means, tending to cause the field-weakening means (e) to assume its actuated reduced-field condition; (m) a means tending to cause a downward transition of the transition-means (d), to a lower-speed motor-combination, whenever said current-responsive means (h) is in its actuated condition; (n) a means tending to cause a substantially simultaneous actuation of the voltage-controlling means (f), whenever said current-responsive means (h) is in its actuated condition; (o) a deactuating means tending, substantially simultaneously, to cause the field-weakening means (e) to assume its normal full-field condition, whenever said current-responsive means (h) is in its actuated condition; and (p) a delayed-operation means, automatically operative when said current-responsive means (h) returns to its nonresponsive condition, to sustain the operation of said deactuating means (o) for a short time-delay which is sufficient for a substantial subsidence of the switching-transients in the motor-currents.

9. A traction-motor control-assembly for an electrically propelled vehicle, including, in combination: (a) a plurality of series-type traction-motors which are to be controlled, each motor having an armature member and a series field-winding; (b) a variable voltage supply-means, for making a variable supply-voltage effectively available for said motors; (c) a master controller, for controlling the operation of said vehicle; (d) a transition-means, for changing the motor-connections from one to another of a plurality of series-parallel motor-combinations; (e) a field-weakening means, which is operative, when actuated from a normal condition to an actuated condition, to reduce the ratio between the field-strength and the motor-current of said motors at a time when the voltage of the supply-source is at least moderately high; (f) a voltage-controlling means, which is operative at all on-positions of the master-controller (c), independently of which on-position is occupied by the master controller; said voltage-controlling means being operative, when actuated from a normal condition to an actuated condition, at a time when the master controller is in an at least moderately advanced on-position, to cause an automatic reduction in said effective supply-voltage, at a rate which is as rapid as is reasonably compatible with an acceptably smooth power-reduction in the motors; said voltage-controlling means being further operative, when restored to its normal condition, to cause an automatic increase in said effective supply-voltage, up to a voltage-value close to the value normally corresponding to the position of the master controller (c), at a somewhat slower rate of voltage-change, which is as rapid as is reasonably compatible with an acceptably smooth power-increase in the motors; (g) a field-controlling voltage-responsive means, responsive to said effective supply-voltage, having an actuating response at a predetermined intermediate value of the effective supply-voltage, and returning to its nonresponsive condition at a predetermined lower value of the effective supply-voltage; (h) a transition-controlling voltage-responsive means, responsive to the voltage of the supply-source, having an actuating response at a predetermined higher value of the effective supply-voltage, and having a holding-circuit means for making its effective return to its nonresponsive condition substantially independent of the value of the effective supply-voltage during expectable operating-conditions; (i) a current-responsive means, responsive to a current which is supplied by said supply-means, having an actuating response at a predetermined high value of said current, and returning to its nonresponsive condition at a predetermined lower value of said current; (j) a means tending to cause an actuation of the field-weakening means (e), whenever the field-controlling voltage-responsive means (g) is in its actuated condition; (k) a means tending to cause an actuation of the voltage-controlling means (f), whenever the transition-controlling voltage-responsive means (h) is in its actuated condition; (l) a means tending to cause an upward transition of the transition-means (d), to a higher-speed motor-combination, when the field-weakening means (e) is in its normal condition and when, at the same time, the transition-controlling voltage-responsive means (h) is in its actuated condition; (m) a means tending to hold the transition-means (d) in said upward-transition condition when said upward transition is completed; (n) a means for causing the transition-controlling voltage-responsive means (h) to return to its nonresponsive condition when said upward transition is completed; (o) a means tending to cause a downward transition of the transition-means (d), to a lower-speed motor-combination, when said current-responsive means (i) is in its actuated condition; (p) a means tending to cause a substantially simultaneous actuation of the voltage-controlling means (f), whenever said current-responsive means (i) is in its actuated condition; (q) a deactuating means tending, substantially simultaneously, to cause the field-weakening means (e) to assume its normal full-field condition, whenever said current-responsive means (i) is in its actuated condition; and (r) a delayed-operation means, automatically operative when said current-responsive means (i) returns to its nonresponsive condition, to sustain the operation of said deactuating means (q) for a short time-delay which is sufficient for a substantial subsidence of the switching-transients in the motor-currents.

10. A traction-motor control-assembly for an electrically propelled vehicle, including, in combination: (a) a plurality of series-type traction-motors which are to be controlled, each motor having an armature member and a series field-winding; (b) a variable-voltage supply-means, for making a variable supply-voltage effectively available for said motors; (c) a master controller, for controlling the operation of said vehicle; (d) a slip-relay, for automatically changing from a normal condition to an actuated condition when one or more of said motors is slipping, said slip-relay being further automatically operative to restore itself to its normal condition at the termination of the slipping-period; (e) a transition-means, for changing the motor-connections from one to another of a plurality of series-parallel motor-combinations; (f) a voltage-controlling means, which is operative at all on-positions of the master controller (c), independently of which on-position is occupied by the master controller; said voltage-controlling means being operative, when actuated from a normal condition to an actuated condition, at a time when the master controller is in an at least moderately advanced on-position, to cause an automatic reduction in said effective supply-voltage, at a rate which is as rapid as is reasonably compatible with an acceptably smooth power-reduction in the motors; said voltage-controlling means being further operative, when restored to its normal condition, to cause an automatic increase in said effective supply-voltage, up to a voltage-value close to the value normally corresponding to the position of the controller (c), at a somewhat slower rate of voltage-change, which is as rapid as is reasonably compatible with an acceptably smooth power-increase in the motors; (g) an upward-transition initiating-means, which is operative, when actuated from a normal condition to an actuated condition, to cause an automatic actuation of the voltage-controlling means (f), as an initial upward-transition step; said upward-transition initiating-means also including a means for causing an upward transition of the transition-means (e), to a higher-speed motor-combination; (h) a downward-transition initiating-means, which is operative, when actuated from a normal condition to an actuated condition, to cause an automatic actuation of the voltage-controlling means (f); said downward-transition initiating-means also including a means for causing a downward transition of the transition-means (e), to a lower-speed motor-combination; and (i) a means for causing an automatic actuation of the voltage-controlling means (f) whenever said slip-relay (d) is in its actuated condition.

11. A power-plant including: (a) a fuel-consuming prime mover; (b) a master controller, for controlling the operation of said power-plant, said master controller including a variable fluid-pressure means, for supplying a control-fluid, in a master-controller output-pipe, at pressures varying between a predetermined minimum pressure and a predetermined maximum pressure, according to the position of said master controller; (c) a governor-controlling fluid-pressure pipe; (d) a governor for controlling the fuel-input into said prime mover (a), in a differential response to the pressure in said governor-controlling fluid-pressure pipe (c) and the speed of the prime mover (a); (e) a valve, having a normal position in which said governor-controlling pipe (c) is connected to said master-controller output-pipe, said valve being movable to an actuated position in which said governor-controlling pipe is connected to a pressure-reducing opening; and (f) a valve-actuating means, for moving said valve (e) to its actuated position, when a brief speed-drop is needed at a time when the master controller (b) is in an at least moderately advanced position, and for restoring said valve (e) to its normal position when said momentary need is over; (g) said power-plant being further characterized by the fluid-pressure means of said master controller (b) including a sufficient passage-restriction means, to make the rate of pressure-increase in the governor-controlling pipe (c), when the valve (e) is restored to its normal position after a movement to its actuated position, sensibly slower than the rate of pressure-decrease when the valve (e) was moved to its actuated position.

12. The invention as defined in claim 11, in combination with: (h) a source of fluid-pressure, which is maintained at approximately the minimum output-pressure of the master controller (b), in communication with the reduced-pressure opening of the valve (e).

13. A traction-motor control-assembly for an electrically propelled vehicle, including the combination, with the traction-motor or motors which are to be controlled, of: (a) a variable-voltage dynamoelectric generator, for applying a variable supply-voltage to said motor or motors, said generator having an exciting field-winding; (b) a variable-voltage exciter-means, for causing a variable excitation-voltage to be applied to the exciting field-winding of said generator; (c) a fuel-consuming prime mover, for driving said generator; (d) a master controller, for controlling the operation of said vehicle, said master controller including a variable fluid-pressure means, for supplying a control-fluid, in a master-controller output-pipe, at pressures varying between a predetermined minimum pressure and a predetermined maximum pressure, according to the position of said master controller; (e) a governor for controlling the fuel-input into said prime mover (c) in a differential response to the fluid-pressure of the master controller (d) and the speed of the prime mover (c); (f) a load-positioner rheostat, operatively associated with said exciter-means (b), in such manner as to control the voltage-buildup response of the generator (a) with respect to the generator-speed; said load-positioner rheostat being movable between a normal position, in which the generator-voltage is a minimum, and various actuated positions in which the generator voltage-buildup is increased, according to the position of said rheostat; and (g) a dual load-positioner actuating-means, for actuating said load-positioner rheostat (f); said dual actuating-means including a master-controller controlled actuator, including a first lost-motion means for pushing said rheostat (f) toward its normal position, a first spring for operatively pushing said first lost-motion means, and a pressure-responsive means, responsive to the fluid-pressure of the master controller (d), for at times overcoming said first spring and for retracting said first lost-motion means; said dual actuating-means also including a speed-responsive actuator, including a second lost-motion means for pushing said rheostat (f) in a direction toward its normal position, a second spring for operatively pushing said second lost-motion means, and a speed-responsive means, responsive to the speed of the prime mover (c), for at times overcoming said second spring, and for retracting said second lost-motion means; and said dual actuating-means further comprising a third spring for biasing said rheostat (f) toward said second lost-motion means.

14. The invention as defined in claim 13, characterized by said governor (e) being of a type having a small droop in its speed-versus-load curve.

15. The invention as defined in claim 13, in combination with: (h) a temperature-responsive means, responsive to a temperature-condition of the prime mover (c), for operating, within a predetermined temperature-range, to combine with the effect of the speed-responsive means of the speed-responsive actuator of the dual load-positioner actuating-means (g), to modify said response in a predetermined manner.

16. A traction-motor control-assembly for an electrically propelled vehicle, including the combination, with the traction-motor or motors which are to be controlled, of: (a) a variable-voltage dynamoelectric generator, for applying a variable supply-voltage to said motor or motors, said generator having an exciting field-winding; (b) a variable-voltage exciter-means, for causing a variable excitation-voltage to be applied to the exciting field-winding of said generator; (c) a fuel-consuming prime mover, for driving said generator; (d) a master controller, for controlling the operation of said vehicle, said master controller including a variable fluid-pressure means, for supplying a control-fluid, in a master-controller output-pipe, at pressures varying between a predetermined minimum pressure and a predetermined maximum pressure, according to the position of said master controller; (e) a governor-controlling fluid-pressure pipe; (f) a governor for controlling the fuel-input into said prime mover (c), in a differential response to the pressure in said governor-controlling fluid-pressure pipe (e) and the speed of the prime mover (c); (g) a valve, having a normal position in which said governor-controlling pipe (e) is connected to said master-controller output-pipe, said valve being movable to an actuated position in which said governor-controlling pipe is connected to a pressure-reducing opening; (h) a load-positioner rheostat, operatively associated with said exciter-means (b), in such manner as to control the voltage-buildup response of the generator (a) with respect to the generator-speed; said load-positioner rheostat being movable between a normal position, in which the generator-voltage is a minimum, and various actuated positions in which the generator voltage-buildup is increased, according to the position of said rheostat; (i) a dual load-positioner actuating-means, for actuating said load-positioner rheostat (h); said dual actuating-means including a valve-controlled actuator, including a first lost-motion means for pushing said rheostat (h) toward its normal position, a first spring for operatively pushing said first lost-motion means, and a pressure-responsive means, responsive to the fluid-pressure in said governor-controlling pipe (e), for at times overcoming said first spring and for retracting said first lost-motion means; said dual actuating-means also including a speed-responsive actuator, including a second lost-motion means for pushing said rheostat (h) toward an intermediate actuated position, a second spring for operatively pushing said second lost-motion means, and a speed-responsive means, responsive to the speed of the prime mover (c), for at times overcoming said second spring, and for retracting said second lost-motion means; and said dual actuating-means further comprising a third spring for biasing said rheostat (h) toward said second lost-motion means; and (j) a motor-controlling valve-actuating means, for moving said valve (g) to its actuated position, when a brief voltage-drop is needed by said motor or motors at a time when the master controller (d) is in an at least moderately advanced position, and for restoring said valve (g) to its normal position when said momentary need is over.

17. The invention as defined in claim 16, characterized by the fluid-pressure means of said master controller (d) including a sufficient passage-restriction-means, to make the rate of pressure-increase in the governor-controlling pipe (e), when the valve (g) is restored to its normal position after a movement to its actuated position, sensibly slower than the rate of pressure-decrease when the valve (g) was moved to its actuated position.

18. The invention as defined in claim 16, characterized by the first spring of the dual load-positioner actuating-means (i) being sufficiently strong to overpower the speed-responsive actuator when the valve (g) is moved to its actuated position at a time when the master controller (d) is in an advanced position.

19. In combination, a fuel-consuming engine; a load-device which is driven by the power produced by said engine; a multiposition controller-means, having a means for providing an output-pipe having a variable output fluid-pressure which is dependent upon the position of the controller-means; a differentially responsive governor, having a governor-controlling fluid-pressure input-pipe, a fluid-pressure input control-means which is responsive to the fluid-pressure in said pipe, an oppositely acting control-means which is responsive to a function of the engine-speed, and an output-means which is responsive to the condition of balance or unbalance of the governor; a means for controlling the fuel-supply to the engine in such amounts as may be necessary to maintain a desirably balanced condition of said governor; a valve which is connected to the governor-controlling fluid-pressure input-pipe; and a supply-connection between the output-pipe of the controller-means and the valve; said valve having a normal position in which said governor-controlling fluid-pressure input-pipe is connected to said supply-connection, and said valve being movable to an actuated position in which said governor-controlling fluid-pressure input pipe is connected to a pressure-reducing valve-opening.

20. In combination, a fuel-consuming engine; a load-device which is driven by the power produced by said engine; a multiposition controller-means, having a means for providing an output-pipe having a variable output fluid-pressure which is dependent upon the position of the controller-means; a differentially responsive governor, having a governor-controlling fluid-pressure input-pipe, a fluid-pressure input control-means which is responsive to the fluid-pressure in said pipe, an oppositely acting control-means which is responsive to a function of the engine-speed, and an output-means which is responsive to the condition of balance or unbalance of the governor; a means for controlling the fuel-supply to the engine in such amounts as may be necessary to maintain a desirably balanced condition of said governor; a valve which is connected to the governor-controlling fluid-pressure input-pipe; and a restricted-passage connection between the output-pipe of the controller-means and the valve; said valve having a normal position in which said governor-controlling fluid-pressure input-pipe is connected to said restricted-passage connection, and said valve being movable to an actuated position in which said governor-controlling fluid-pressure input-pipe is connected to a pressure-reducing valve-opening.

21. In combination, a fuel-consuming engine; an electrically driven load; an electric generator which is mechanically connected to said engine; an electric motor which is electrically connected to said generator and mechanically connected to said load; a multiposition controller-means; a speed-controlling device for controlling the fuel-supply to the engine in such amounts as may be necessary to maintain a desirable correspondence between a function of the engine-speed and a speed-controlling setting of said controller-means; and a load-controlling device for controlling the generator-loading in such amounts as may be necessary to maintain a desirable correspondence between the generator-loadings and the most efficient engine-loads at each of a plurality of engine-speeds extending over a substantial portion of the operative range of engine-speeds.

22. In combination, a fuel-consuming engine; an electrically driven load; an electric generator which is mechanically connected to said engine; an electric motor which is electrically connected to said generator and mechanically connected to said load; a multiposition controller-means, having a means for providing a variable output fluid-pressure which is dependent upon the position of the controller-means; a differentially responsive governor having an input-pressure fluid-means which is responsive to the variable output fluid-pressure of the controller-means, said governor having an oppositely acting means which is responsive to a function of the engine-speed; a main load-controlling device for substantially maintaining selected generator-loadings which are different for different engine-speeds over a substantial portion of the operative range of engine-speeds; an auxiliary load-controlling device for further controlling the generator-loading in response to the input-pressure of the governor over at least a portion of the operative range of engine-speeds; and a speed-controlling device for controlling the fuel-supply to the engine in response to the governor, over the entire operative range of engine-speeds.

23. In combination, a fuel-consuming engine; a direct-current generator which is mechanically connected to said engine, said generator having a separately excited field-winding; a direct-current exciting-means, having a speed-responsive means for making the voltage-output of the exciting-means vary in response to the speed of the engine, and having a controlling-means for adjusting the voltage-level of the exciting-means, said speed-responsive means being of such nature as to make the characteristic power-versus-speed curve of the generator approximate the characteristic power-versus-speed curve of the engine; an electrically driven load; a series direct-current motor having an armature member which is electrically connected to the generator-armature and mechanically connected to the load; a multiposition controller-means, having a means for providing a variable output fluid-pressure which is dependent upon the position of the controller-means; a differentially responsive governor, having an input-pressure fluid-means which is responsive to the variable output fluid-pressure of the controller-means, an oppositely acting control-means which is responsive to a function of the engine-speed, and an output-means which is responsive to the condition of balance or unbalance of the governor; a means for controlling the fuel-supply to the engine in such amounts as may be necessary to maintain a desirably balanced condition of said governor; a main load-controlling means for controlling the voltage-level of the exciting-means in such amounts as may be necessary to maintain a desirable correspondence between the generator-loadings and the most efficient engine-loads at each of a plurality of engine-speeds extending over a substantial portion of the operative range of engine-speeds; and an auxiliary load-controlling means for further adjusting the voltage-level of the exciting-means in response to predetermined fluid-pressure conditions in the input-pipe of the governor over at least a portion of the operative range of engine-speeds.

References Cited in the file of this patent

UNITED STATES PATENTS

| | | |
|---|---|---|
| 2,292,203 | Cowin | Aug. 4, 1942 |
| 2,304,937 | Lillquist | Dec. 15, 1942 |

(Other references on following page)

UNITED STATES PATENTS

| | | |
|---|---|---|
| 2,337,717 | Hines | Dec. 28, 1943 |
| 2,365,418 | Lillquist | Dec. 19, 1944 |
| 2,431,145 | Staples et al. | Nov. 18, 1947 |
| 2,449,399 | Lillquist | Sept. 14, 1948 |
| 2,516,198 | Frier | July 25, 1950 |
| 2,523,753 | Dilworth | Sept. 26, 1950 |
| 2,539,173 | Atwell et al. | Jan. 23, 1951 |
| 2,546,023 | Stamm | Mar. 20, 1951 |
| 2,551,438 | Johnson | May 11, 1951 |
| 2,626,362 | Johansson | Jan. 20, 1953 |
| 2,632,996 | Rood | Mar. 31, 1953 |